Patented Apr. 14, 1931

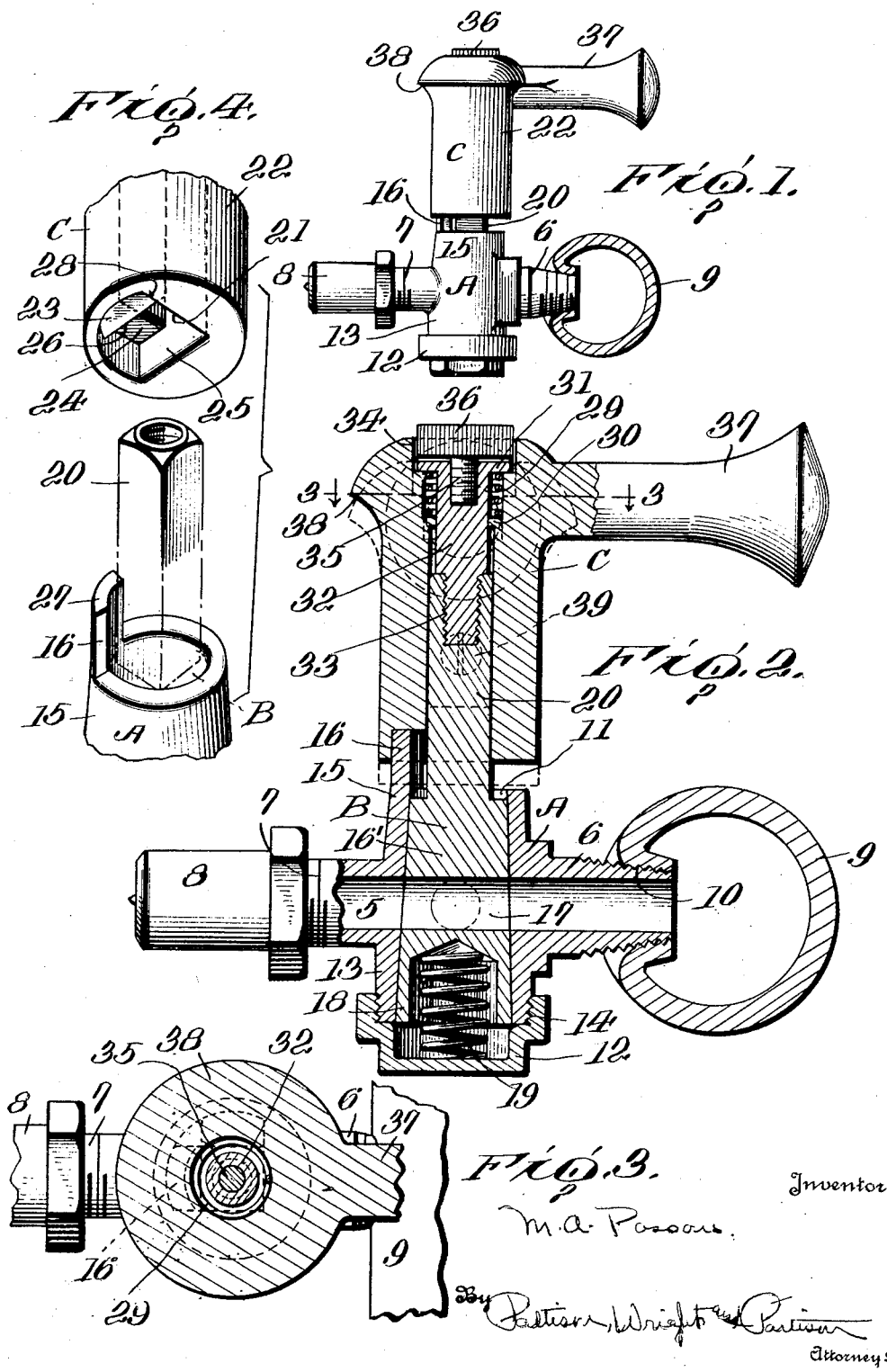

1,801,175

UNITED STATES PATENT OFFICE

MINARD A. POSSONS, OF CLEVELAND, OHIO, ASSIGNOR TO AMERICAN STOVE COMPANY, OF ST. LOUIS, MISSOURI, A CORPORATION OF NEW JERSEY

COCK OR VALVE

Application filed September 11, 1929. Serial No. 391,795.

This invention relates to improvements in cocks or valves being more particularly and specifically directed to a safety cock or valve for use on gas stoves or ranges and is a continuation in part of my application Serial Number 319,109 filed November 13, 1928.

The primary object of the invention is to provide a gas cock or valve of the so-called safety type which is so constructed as to prevent an accidental opening of the valve.

A further object of the invention is to provide a safety cock or valve incorporating improved features of construction whereby the manufacture of the valve is cheap and the valve is highly efficient in operation.

Other novel features of construction, improved results and advantages of the invention will appear from the following description and accompanying drawings.

In the drawings:—

Figure 1 is a view in side elevation of the improved cock.

Figure 2 is a vertical sectional view through Figure 1.

Figure 3 is a detail transverse sectional view taken on the line 3—3 of Figure 2 looking in the direction indicated by arrows.

Figure 4 is an enlarged detail strung out perspective view illustrating the construction of the locking connection between the valve handle and the valve housing.

Reference now being had to the drawings, A designates the valve housing, B the rotary plug valve and D the operating handle for the valve plug.

Describing the invention in more detail it will be seen that the valve housing A is an integral member having a transverse passageway 5 which extends into the externally threaded pipe portion 6 of the housing and also into the pipe portion 7 of the housing which terminates in the outlet jet 8.

The valve is intended to control the gas supplied by the manifold 9 and the pipe portion 6 of the valve housing has threaded connection therewith as at 10.

In addition to the transverse passageway 5 the valve has a vertical or longitudinal passageway 11 which is tapered to receive the tapered valve plug B.

Both ends of the longitudinal passageway 11 are open but the lower end of the passageway is closed by a suitable cap 12 which is removably attached to the outer end of the pipe portion 13 of the housing forming the lower end of the longitudinal passageway through the medium of suitable threads 15.

The upper end of the longitudinal passageway is formed by a short pipe like section or collar 15 and on the upper edge of this collar is an upwardly extending lug 16 which cooperates with the valve handle to act as a lock and stop in a manner to be hereinafter described.

The valve plug B comprises a main tapered plug portion 16 having therein a transverse passageway 17 which may be made to register with the transverse opening 5 in the valve housing by the rotation of the plug to open the valve and may be rotated so as to bring an imperforate portion of the plug opposite the transverse passagway of the housing when it is desired to close the valve.

This plug is tapered to fit the internal taper of the longitudinal valve housing passageway to form a gas-tight fit. To assure that this fit is gas-tight the lower end of the plug is cut out to form a seat 18 to receive a coil spring 19 which is held in position by the cap 12 and exerts a constant pushing pressure upon the valve plug to make a gas-tight connection between the plug and the housing.

The plug beyond its circular tapered portion 16 is provided with an elongated squared shaft 20 and this shaft carries the operating handle C. The squared shaft 20 is positioned in the squared opening 21 which is centrally provided in the handle portion 22.

The portion 22 of the handle is tubular in form and in addition to having the longitudinal squared opening 21 for the reception of the shaft 20 it has an inset slideway 23 adjacent one side of the opening 21 and an inset seat 24 at an adjacent side of the squared passageway.

When the handle is placed upon the shaft the lug 16 of the housing abuts the seat 24 and locks the valve handle against rotation as the edges of the lug engage the walls 25 and 26 at the side of the seat 24.

When it is desired to rotate the valve handle to rotate the valve plug the handle is lifted or pulled outwardly so that the upper end 27 of the lug can slide upon the slideway 23 in the end of the valve handle. The limit of rotation is controlled by the wall 28 which forms an abutment for the lug and prevents further rotation of the handle.

In its normal position the valve is closed and the valve handle locked against rotation. This is due to the fact that a coil spring 29 normally exerts a downward pressure upon the handle. This spring 29 is contained within the upper end of the handle as clearly appears in Figure 2 of the drawings and its lower end rests upon an integrally formed circumferential seat 30 while its upper end abuts the under side of the enlarged head 31 of the push button carrying shank 32 which shank is threadedly attached as at 33 to the upper end of the squared shaft 20 of the valve plug.

Thus it will be seen that this spring 29 exerts a downward force upon the valve operating handle to push it in locked position.

The enlarged head 31 of the push button carrying shank is contained within a suitable counter bore 34 in the upper end of the tubular portion 22 of the valve handle and threadedly attached to the shank as at 35 is a push button 36 which extends outwardly beyond the end of the tubular portion 22 of the handle, which can be readily engaged by the thumb of the operator of the valve.

The valve handle C in addition to its tubular portion 22 has an end grasp portion 37 which extends at right angles to the tubular portion whereby the valve can be rotated.

Adjacent its upper end the tubular portion of the valve handle is flared outwardly as at 38 completely around its circumference. This is for the purpose of more easily exerting upon the valve handle the outward pull necessary to release it from the locked position. When operating the valve the first finger of the operator would be applied to the tubular portion under this flare 38 while the second finger would probably be under the handle 37. The thumb of the operator would be against the button 36 and between the thumb and the two fingers the necessary outward pull upon the valve handle can be easily applied to permit its rotation to open the valve.

From the foregoing the operation of the valve is thought to be entirely clear especially taken in conjunction with Figure 2 wherein the open position of the valve is shown in full lines while the closed and locked position is illustrated in dotted lines.

With the gas cock made in accordance with this invention it will be readily apparent that the accidental opening of the valve is prevented and that a safety valve is provided inasmuch as babies and young children can not easily open the valve by tampering with it.

At some time it may be desirable to have the valve operate as an ordinary valve, that is to say, operate as a plain valve rather than a safety valve. To this end a screw 39 is provided which passes through the tubular portion 22 of the handle and engages a suitable depression provided in the squared shaft 20. By means of this screw the handle can be pulled outwardly into its unlocked position and locked there by taking down the screw. The handle being locked in its unlocked position the valve will operate as an ordinary valve and can be rotated freely to effect either an open or a closed position.

Having thus described my invention what I claim and desire to secure by Letters Patent is:—

1. In combination with a rotary valve having a housing provided with transversely arranged and aligned inlet and outlet openings, and a longitudinal tapered passageway open at both ends and at one end provided with an outwardly projecting lug, of a valve member within said housing, of a tapered plug in said tapered housing passageway for closing the ends of the same, a transverse passageway in said plug adapted for alignment with said transverse housing passageway, a cap carried by said housing beyond the large end of the plug, an inset seat in the large end of the plug adjacent said cap, a coil spring mounted in said seat between the plug and the cap and exerting a pressure upon the plug to hold it within the tapered passageway, said plug being provided with an elongated squared shank, a valve operating handle of an L shape reciprocably mounted upon said shank, means holding said valve handle against longitudinal displacement from said shank, one end of said operating handle being provided with a seat for the reception of said housing lug to lock the handle against rotation, a slideway in said handle end adjacent said seat, and means to reciprocate and rotate said handle to position the housing lug in said slideway, for the purpose described.

2. A rotary valve construction comprising a housing having transversely arranged and aligned inlet and outlet openings, a longitudinal elongated passageway transverse said inlet and outlet openings and open at both ends and at one end provided with an outwardly projecting lug, a valve member within said housing comprising a tapered elongated plug for closing the ends of the housing, said plug being provided with a transverse passageway adapted for alignment with the inlet and outlet openings of the housing, and an inset seat in the large end of the plug, a cap carried by said housing beyond the large end of the plug, a coil spring mounted in said plug seat and under tension between the plug and the cap for exerting a pressure upon the plug to hold it within the tapered passageway, the small end of the plug being provided with an elongated squared shank, an operating handle for the valve plug having a squared opening for the reception of the elongated squared portion of the valve plug, said operating handle being further provided with an opening for the reception of the housing lug to lock the handle against rotation, said elongated squared portion of the valve plug carrying on its end a push button extending beyond the valve handle to aid in the reciprocation of the handle upon the shank, a coil spring surrounding the shank and exerting a pressure upon the operating handle to normally hold it in locked relation with the housing lug, and means to reciprocate said handle upon the shank to move the handle out of engagement with the housing lug and permit rotation of the valve plug for the purpose described.

3. An improved valve construction comprising a housing having therein a rotary plug valve element, an inlet opening in said housing and an outlet opening in said housing controlled by said plug, said housing at one end being provided with a projecting lug, the plug element having an elongated shank projecting beyond the housing end carrying the lug, a plug operating handle having therein a squared opening for the reception of the elongated squared shank of the plug, said handle being further provided with an angular seat for the reception of said housing lug, means normally holding said operating handle in a position wherein the lug is within the seat and locking the handle against rotation, said handle being further provided with an elongated guideway terminating at one end in a wall forming a stop, means to move said handle outwardly upon the shank and to rotate the same whereby said housing lug is rotated over said guideway.

4. In combination with a valve of the rotary plug type, having a housing provided with an arc-shaped projecting lug and the valve plug member provided with an elongated squared shank, of a handle for rotating said valve member, said handle being provided with a hub having therein a squared opening for the reception of the squared shank of the valve member, said handle hub at its inner end adjacent the valve housing being further provided with a seat positioned at one side of the squared opening therein for the reception of the said housing lug, means to normally hold the handle inwardly with the housing lug positioned within said seat and preventing the rotation of the handle, a guideway also within the end of the handle hub of a less depth than the lug seat and of a length equal to the length of the plug seat plus the width of one side of the squared shank opening and terminating in an abrupt wall at its end remote from the lug seat, means to move said handle outwardly and rotate the same whereby the housing lug moves lengthwise of the guideway until stopped by the abrupt wall at its end, the outer wall of the handle hub forming a closure at one end of the lug seat and for one side of the guideway, and means preventing the complete removal of the housing lug from within the end of the handle hub during the operation of the opening or closing of the valve.

In testimony whereof I hereunto affix my signature.

MINARD A. POSSONS.